Patented May 20, 1952

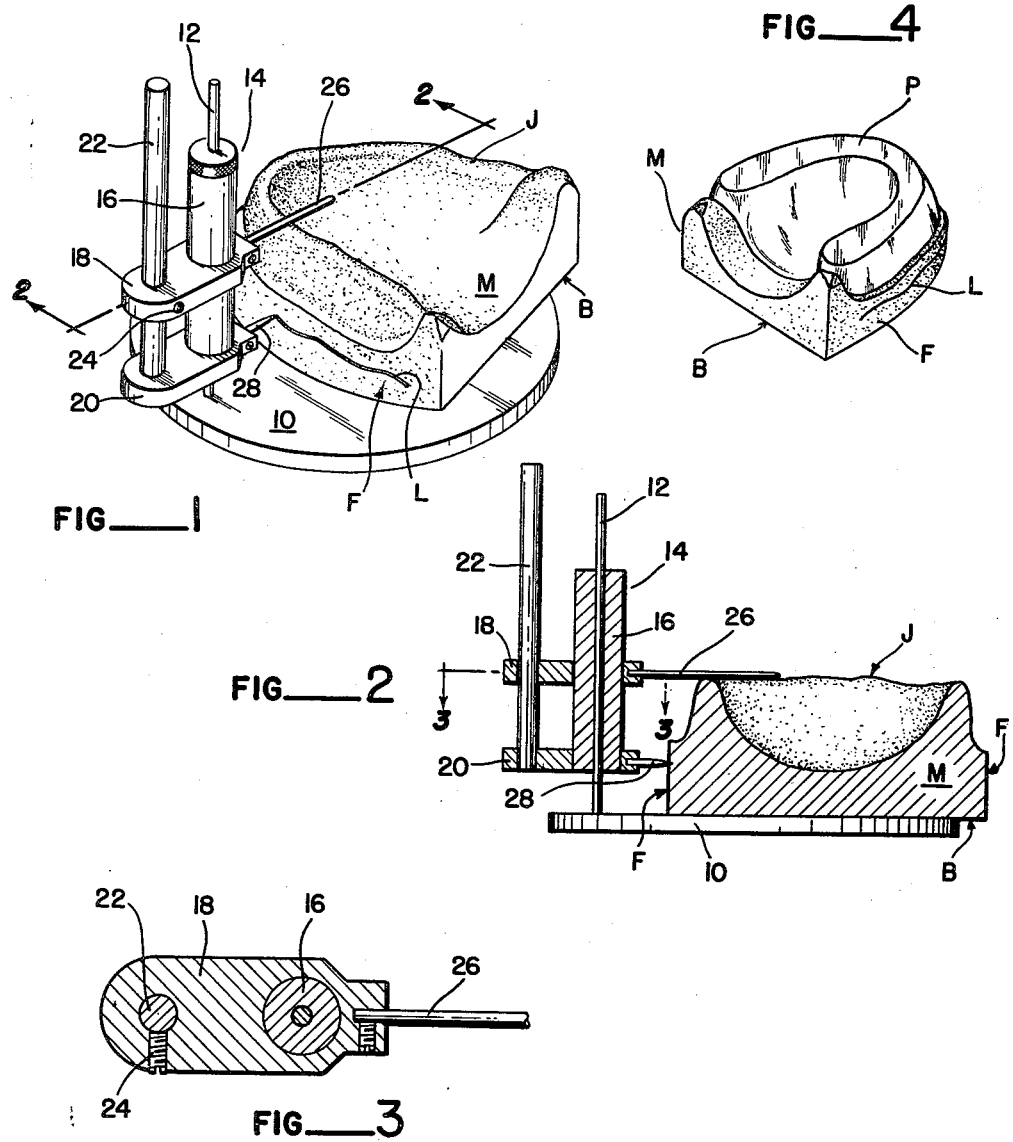

2,597,661

UNITED STATES PATENT OFFICE 2,597,661

APPARATUS FOR SCRIBING DENTAL MODELS

Duncan S. McPhee, Seattle, Wash.

Application July 21, 1950, Serial No. 175,045

2 Claims. (Cl. 33—42)

This invention relates to an apparatus for scribing dental models and, more particularly, pertains to the transfer of jaw ridge profiles in a dental model to an upright marginal face of such a model that is not normally concealed when the dental bite-plate is in position.

In the preparation of dentures, the technician encounters considerable difficulty during the mounting of the models in the articulators, in positioning the model in a desired fore-and-aft aspect to properly bisect the intermaxillary space as is most satisfactory for the patient's subsequent use of the dentures produced according to the articulator and model settings. These difficulties stem, largely, from the fact that when the upper and lower models are assembled together with the wax bite-plates in position, the jaw ridges of the models are concealed from view and the technician has no way of knowing in just what planes the two jaw ridges lie with respect to the horizontal or with respect to each other. I have determined that the problem of bisecting the intermaxillary space between models during their mounting in an articulator can be considerably facilitated by transferring the jaw ridge profile onto a normally available upright marginal surface of the model where it may be viewed by the technician. It should be understood that models of the nature employed by a dentist in the production of artificial dentures are formed of plaster materials and are accurate reproductions of a patient's jaw. These models are obtained by making impressions of a jaw and forming thereon the model. Following setting, the model is faced to provide a flat surface of considerable extent and generally horizontal with respect to the normal position of the jaw being modelled. The marginal face of the model is ground to provide it with an upright face, that is, at right angles to the base or mounting face and generally surrounds the modelled impression in spaced relation. It is this latter face upon which I prefer to apply a scribed line in transfer of the profile of the jaw ridge that is concealed when the wax bite-plate is located on the model.

Having in mind the foregoing and other well-known attendant difficulties it has been among the important objects of this invention to provide a simple and easily operated apparatus for scribing dental models, an apparatus which accurately transfers a jaw ridge profile to an exposed face of a plaster model, such a device as is adjustable readily to accommodate a wide range of sizes and shapes of models, a device that has feeling and scribing means which may be moved relative each other but which will at the same time be retained in a desired superpositioning, and other and related objects as will be more apparent during the course of the following description.

In the accompanying drawings is shown a preferred form of my invention, and

Figure 1 is a perspective view of my scribing apparatus for dental models;

Figure 2 is a vertical sectional view of the device of Figure 1 taken on line 2—2 thereof;

Figure 3 is a fragmentary sectional view taken on line 3—3 of Figure 2; and

Figure 4 is a perspective view of a dental model having in place thereon the usual bite-plate employed during mounting of the model in an articulator.

The scribbing apparatus includes the base-plate 10 which is a flat, preferably circular plate, of sufficient size to adequately receive a dental model M. Such a model has the reproduction of a patient's jaw formed thereon according to conventional methods and such reproduction includes the jaw ridge J which it is desired to transfer to the marginal face F that has been ground or otherwise formed on the model. Also note that the base face B of the model is planar and generally symmetrical with respect to the general plane of jaw ridge J. The model M lies on the plate 10 and may be slid or rotated thereon with ease, due to a fairly high polish obtained on the plate surface and the smoothness of the model face B.

Plate 10 supports column 12, here shown as being located to one side of the main area of the plate. A slider, designated as a whole by the numeral 14, is mounted on the column 12 to be raised and lowered and also to rotate about the axis of the column. In detail, slider 14 includes the tube 16 which has a central bore to closely fit the column 12. A superposed pair of arms 18 and 20 are secured to the tube 16 in parallel relationship and stand out to one side in an overhanging manner. In one of these arms is secured a guide rod 22 that passes through an aligned opening in the other arm. In Figure 1 the rod 22 is shown secured as by welding in lower arm 20 and is locked on the opposite arm 18 by a set screw 24. Tube 16 may likewise be secured as by welding to arm 20.

Arms 18 and 20, on that side of column 12 opposite the location of guide rod 22, support the feeler finger or pin 26 and the scriber pin 28, respectively. Pin 26 is smooth and blunt and is caused, during use of the apparatus, to travel along the ridge J while, at the same time, the somewhat shorter and sharp scriber pin 28 is marking the face F of the model.

In Figure 2 is shown a typical scribing operation. The model M is placed upon the base plate 10 on which it is readily rotatable. Feeler finger 26 is disposed on ridge J and the model is moved close enough to the column 12 that the pin 28 is caused to contact the plaster model on upright face F. By rotating the model M in this relationship while maintaining the direction of pin 26 at the perpendicular to the general contour of ridge J, it is thus possible to scribe a line L on the plaster model with the scribing taking place immediately below the profile element being reproduced.

Whenever it is necessary to alter the spacing of the finger 26 and pin 28, set screw 24 may be loosened and arms 18 and 20 adjusted closer together or farther apart. In that case, tube 16 aids in maintaining the desired super-positioning of finger 26 over pin 28. It will, of course, be apparent that the slider 14, as a whole, rises or descends on column 12 as the profile of ridge J rises or falls.

Figure 4 shows the need for such a tool as I have described. The model M has fitted to it the bite-plate P which is normally of opaque material and which has the negative impression of the jaw to which a denture is to be fitted. When the model is being placed in an articulator, and the similar matching model is brought to it, it is necessary that the bite-plates for both upper and lower be placed together in simulation of the natural jaw relationship in the mouth. Under such circumstances, the technician is totally in the dark as to just where the jaw ridges are located and he is materially handicapped in so placing these assembled models in his articulator. However, with lines L scribed on each model he can see what the ridge looks like and what its relation to the opposite ridge is. By employing a horizontal sighting line that may be incorporated into the articulator he can, from the side, tilt the models forward or backward with relation to the sighting line and with great accuracy obtain a desirable bisection of the intermaxillary space.

Having thus described my invention, I claim:

1. A device for scribing dental models in the transfer of a jaw ridge profile to a marginal upright face of the model not normally concealed by the bite-plate, comprising: a surface plate of a size to receive a model thereon and rigidly supporting an upstanding column located adjacent the margin thereof, a slider rotatably and slidably mounted on said column, said slider including a scriber pin outstanding at one side and a feeler finger superposed over said pin in parallel alignment, said feeler pin extending from said column axis a greater distance than said scriber pin whereby when said feeler pin is in contact with a jaw ridge of a dental model the scriber pin will be directed at an upright marginal face of the model therebelow and will scribe the same as the model is rotated relative said column.

2. A device for scribing dental models in the transfer of a jaw ridge profile to an upright marginal face of the model not normally concealed by the bite-plate, comprising: a base plate having an upstanding column thereon, a slider longitudinally and rotatably movable on said column, said slider including a superposed pair of arms movable toward and away from each other thereon, a guide bar carried by one of said arms and passing through the other arm of said pair, said guide bar being parallel to said column, a scriber pin outstanding from the lower arm of said slider on that side of the column opposite the guide bar, and a feeler pin on said other arm overlying said scriber pin and extending from said slider a greater distance than said scriber pin whereby when said feeler pin is in contact with a jaw ridge of a dental model the scriber pin will be directed at the upright marginal face of the model therebelow and will scribe the same as the model is rotated relative said column.

DUNCAN S. McPHEE.

REFERENCES CITED

The following references are of record in the file of this patent:

UNITED STATES PATENTS

| Number | Name | Date |
|--------|------|------|
| 641,332 | Sadowski | Jan. 16, 1900 |
| 1,265,431 | Costello | May 7, 1918 |
| 2,325,558 | Uslan | July 27, 1943 |